United States Patent [19]

Gurowitz

[11] Patent Number: 5,246,036

[45] Date of Patent: Sep. 21, 1993

[54] MULTI-PORT ANGLE STOP TYPE OF SHUT-OFF VALVE

[76] Inventor: John Gurowitz, 6433 Topanga Canyon Blvd., Ste. 46 Warner Center, Calif. 91303

[21] Appl. No.: 898,421

[22] Filed: Jun. 15, 1992

[51] Int. Cl.⁵ ............................................. F16K 1/02
[52] U.S. Cl. ...................................... 137/862; 285/341
[58] Field of Search ............... 137/861, 862, 867, 883, 137/887, 866; 285/341; 222/485

[56] References Cited

U.S. PATENT DOCUMENTS 3,810,582  5/1974  Lodge ........................... 137/883 X
4,589,688  5/1986  Johnson ......................... 285/341 X Primary Examiner—Martin P. Schwadron
Assistant Examiner—Kevin L. Lee
Attorney, Agent, or Firm—Keith D. Beecher

[57] ABSTRACT

A multi-port shut-off valve assembly of the type known to the plumbing industry as an angle stop. The valve has a body shaped as a solid rectangle, with an internally threaded port in each face of the body. A shut-off valve is received in one of the ports, and it controls the flow of water entering the body from another of the ports to the remaining ports. A number of fittings are threaded into the remaining ports, the fittings being either compression unions or compression reducing unions, and each of the fittings has external threads at each end thereof. Water-carrying tubes are respectively coupled to the fittings by compression nuts threaded thereto.

6 Claims, 1 Drawing Sheet

MULTI-PORT ANGLE STOP TYPE OF SHUT-OFF VALVE

BACKGROUND OF THE INVENTION

The invention relates to a multi-port shut-off valve of the type known to the plumbing industry as an angle stop. Angle stops are usually mounted in the domestic water supply lines to kitchen and bathroom sinks and toilets, and they are used to shut off the water to the individual facilities when so desired.

An object of the present invention is to provide an angle stop valve which is constructed to include a body with number of internally threaded ports. The angle stop of the invention serves to provide a versatile water service unit for a plurality of kitchen and bathroom facilities, as well as for ice makers, water filters, water heaters, and the like.

The assembly of the invention includes in addition to the multi-port angle stop, a plurality of fittings in the form, for example, of compression reducing unions, which are threaded into the various ports in the body of the angle stop, and which includes compression nuts and sleeves to enable water supply tubes of various sizes to be attached to the unit.

The specific multi-port angle stop shut-off valve to be described allows the user to couple up to four (4) water supply lines of the same or different sizes from a single water source at the same time.

In a specific embodiment of the invention, the body of the multi-port angle stop shut-off valve was equipped with four 3' inch ports each threaded with No. 19 British Threads. Four fittings were provided in the form of compression unions and/or compression reducing unions of the following dimensions and thread types.

1. $\frac{3}{8}$"—#19 Male British Thread × $\frac{1}{4}$" O.D. Compression Thread.
2. $\frac{3}{8}$"—#19 Male British Thread × $\frac{3}{8}$" O.D. Compression Thread.
3. $\frac{3}{8}$"—#19 Male British Thread × $\frac{1}{2}$" Male Pipe Thread.
4. $\frac{3}{8}$"—#19 Male British Thread × 7/16" O.D. Compression Thread
5. $\frac{3}{8}$"—#19 Male British Thread × $\frac{1}{2}$" O.D. Compression Thread.

It is to be understood that the foregoing dimensions and thread types are given merely by way of example and are not intended to limit the invention in anyway.

DETAILED DESCRIPTION OF THE ILLUSTRATED EMBODIMENT

Figure 1:
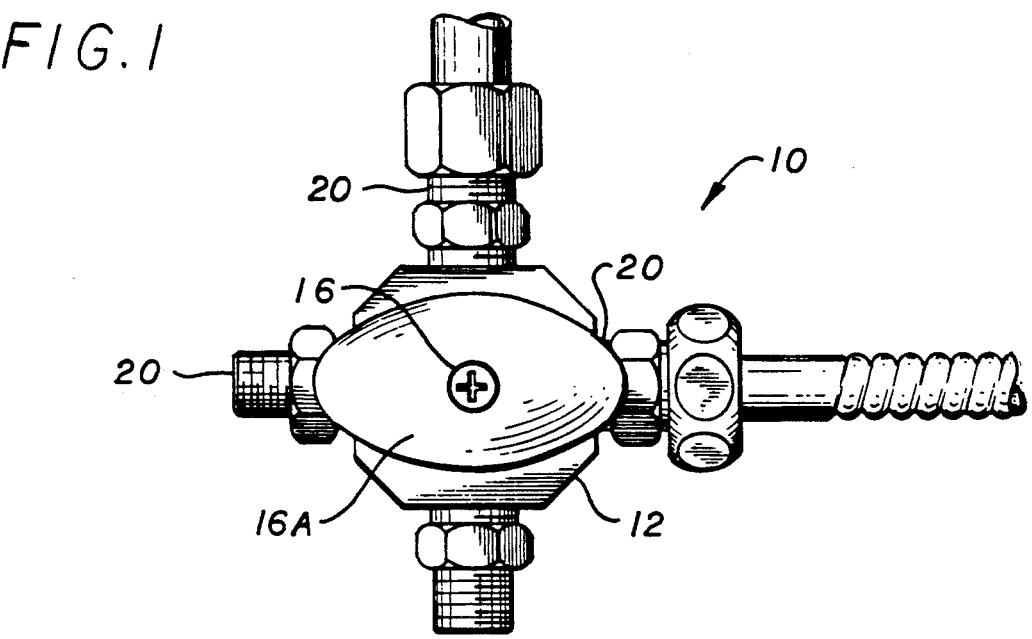
FIG. 1 is a top plan view of an angle stop shut-off valve constructed in accordance with the concepts of the invention.
Figure 2:
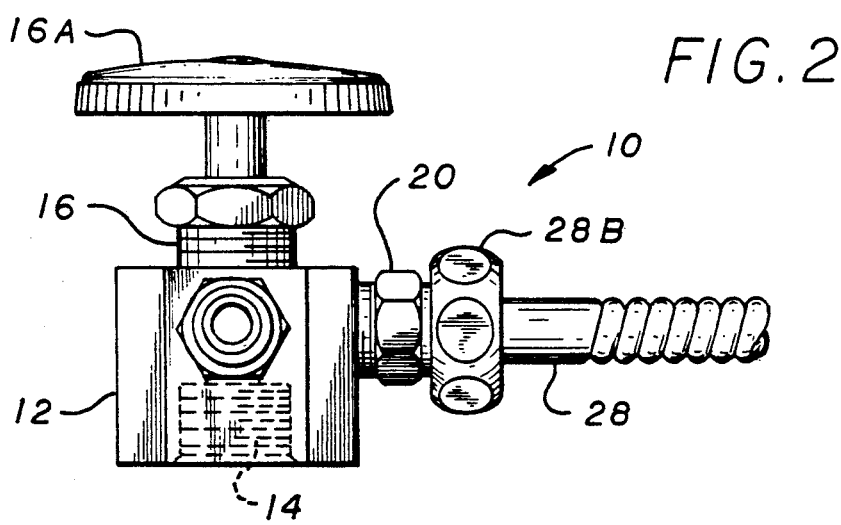
FIG. 2 is a side elevational view of the shut-off valve of FIG. 1 shown coupled to a water carrying pipe, and also to a water carrying tube.

The angle stop shut-off valve of the invention is designated generally as 10 in FIGS. 1 and 2. The unit includes a body 12 having an essentially solid hexagonal configuration. Body 12 defines eight (8) side faces, a top face and a bottom face. Internally threaded ports are provided in four of the side faces and in the top and bottom faces. The ports extend into the interior of the valve and are coupled to one another. A valve 16 is threaded into the port in the top face of body 12, and it is controlled by a handle 16A. The port, identified as port 14, in the bottom face of the body from the valve functions as an inlet port. The valve 16 controls the flow of water from the inlet port to all of the four remaining ports in the valve body.

Fittings 20 are threaded into the remaining ports. The fittings 20, as mentioned above, may be compression unions or compression reducing unions, which, in each instance, have male threads at each end. The threads may be of different types, and the external portion of each fitting may be of a selected diameter to receive a water carrying tube 28 (FIG. 2) of corresponding diameter.

As shown in FIG. 2, the water carrying tube 28 may be coupled to a corresponding one of the fittings 20 by a compression nut 28B.

Figure 3:
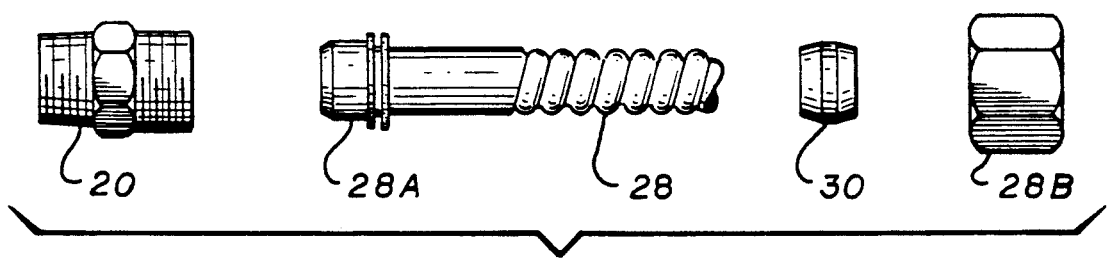
FIG. 3 is a detached view showing the manner in which the tube of FIG. 2 is coupled to the body of the angle stop shut-off valve.

As best shown in FIG. 3, the water carrying tube 28 has an extremity 28A which is held adjacent to the end of the corresponding fitting 20 by means of a compression sleeve 30. The compression sleeve is forced against the end of the tube as a compression nut 28B is threaded onto the external threads of the fitting 20.

It will be appreciated that while a particular embodiment of the invention has been shown and described, modifications may be made. It is intended in the Claims to cover all modifications which come within the true spirit and scope of the invention.

I claim:

1. An angle stop type of shut-off valve comprising: a body having a generally solid configuration and defining four side faces, a top face and a bottom face, with each face having an internally threaded port therein communicating with the interior of the body, the port in said bottom face serving as an inlet port, and a shut-off valve received in the port in said top face, said shut-off valve controlling the flow of water from said inlet port to the remaining ports in the side faces of said body.

2. The shut-off valve defined in claim 1, and which includes a fitting received in at least one of said remaining ports in the side faces of said body, said fitting having male threads at each in thereof.

3. The shut-off valve defined in claim 2, in which said fitting is a compression union.

4. The shut-off valve defined in claim 2, in which said fitting is a compression reducing union.

5. The shut-off valve defined in claim 2, in which said fitting has different threads at each end thereof.

6. The shut-off valve defined in claim 2, and which includes a water-carrying tube, and a compression nut threaded to said fitting for coupling said tube thereto.

* * * * *